US011845393B2

(12) United States Patent
Suzuki et al.

(10) Patent No.: US 11,845,393 B2
(45) Date of Patent: Dec. 19, 2023

(54) FAR-SIDE AIRBAG DEVICE

(71) Applicant: TOYODA GOSEI CO., LTD., Kiyosu (JP)

(72) Inventors: Kyohei Suzuki, Kiyosu (JP); Takeki Hayashi, Kiyosu (JP); Masao Kino, Kiyosu (JP); Takayuki Umeyama, Kiyosu (JP); Takashi Ichimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/059,507

(22) Filed: Nov. 29, 2022

(65) Prior Publication Data

US 2023/0166683 A1    Jun. 1, 2023

(30) Foreign Application Priority Data

Dec. 1, 2021    (JP) .................................. 2021-195474

(51) Int. Cl.
| | |
|---|---|
| *B60R 21/231* | (2011.01) |
| *B60R 21/207* | (2006.01) |
| *B60R 21/2338* | (2011.01) |
| *B60R 21/233* | (2006.01) |

(52) U.S. Cl.
CPC .......... *B60R 21/231* (2013.01); *B60R 21/207* (2013.01); *B60R 21/233* (2013.01); *B60R 21/2338* (2013.01); *B60R 2021/23146* (2013.01); *B60R 2021/23161* (2013.01);
(Continued)

(58) Field of Classification Search
CPC ............ B60R 21/231; B60R 21/23138; B60R 21/207; B60R 21/2338; B60R 21/233; B60R 2021/23161; B60R 2021/23146; B60R 2021/23382; B60R 2021/23324; B60R 2021/0048; B60R 2021/23308
See application file for complete search history.

(56) References Cited

U.S. PATENT DOCUMENTS

| | | | |
|---|---|---|---|
| 2006/0131847 A1 | 6/2006 | Sato et al. | |
| 2018/0326938 A1* | 11/2018 | Rickenbach | ........ B60R 21/2338 |

FOREIGN PATENT DOCUMENTS

| | | | |
|---|---|---|---|
| JP | 2006-008105 A | | 1/2006 |
| JP | 2011178188 A | * | 9/2011 |

(Continued)

*Primary Examiner* — Keith J Frisby
(74) *Attorney, Agent, or Firm* — POSZ LAW GROUP, PLC

(57) ABSTRACT

The far side airbag system has an airbag which is deployed and inflated between adjacent vehicle seats arranged side-by-side in the width direction when an impact is detected against one of a pair of side wall portions of the vehicle. The airbag includes an upper inflation portion having a portion deployed and inflated on a lateral side of a head portion of an occupant seated in the vehicle seat on a side farther from the specific side wall portion, and a lower inflation portion in which a portion including at least a lower end of the lower inflation portion is deployed and inflated between a console box arranged between the adjacent vehicle seats and the occupant. In the upper inflation portion, the portion positioned on the lateral side of the head portion is deployed and inflated such that a dimension in the width direction increases toward a front side.

5 Claims, 5 Drawing Sheets

(52) U.S. Cl.
CPC .............. *B60R 2021/23308* (2013.01); *B60R 2021/23382* (2013.01)

(56) References Cited

FOREIGN PATENT DOCUMENTS

| | | |
|---|---|---|
| JP | 2014-069729 A | 4/2014 |
| JP | 2017-114456 A | 6/2017 |

* cited by examiner

FAR-SIDE AIRBAG DEVICE

CROSS-REFERENCE TO RELATED APPLICATIONS

The present application claims the benefit of priority of Japanese Patent Application No. 2021-195474, filed on Dec. 1, 2021, the content of which is incorporated herein by reference.

TECHNICAL FIELD

The present invention relates to a far-side airbag device that protects, with an airbag, an occupant seated in a vehicle seat on a side farther from a side wall portion of a vehicle such as a wheeled vehicle when it is detected that an impact is applied or when an impact is predicted to be applied to the side wall portion from a lateral side or an oblique front side.

BACKGROUND ART

Wheeled vehicles in which a plurality of wheeled vehicle seats are arranged in parallel in a width direction of the wheeled vehicle seats include a wheeled vehicle in which a far-side airbag device is mounted. An airbag of the far-side airbag device is fixed together with a gas generator in a side portion of a wheeled vehicle seat that is closer to an adjacent wheeled vehicle seat.

Then, when it is detected that an impact is applied or when an impact is predicted to be applied to a side wall portion of a side door or the like of the wheeled vehicle from a lateral side or an oblique front side due to crash or the like, inflation gas is ejected from the gas generator. Due to the inflation gas, the airbag is inflated out of the side portion, and is deployed and inflated between adjacent wheeled vehicle seats. An upper body of an occupant seated in a wheeled vehicle seat farther from the side wall portion to which an impact is applied moves toward the side wall portion due to inertia, but is received by the airbag and protected from the impact.

One aspect of the above far-side airbag device is described in, for example, JP2014-69729A. A lower portion of the airbag (main bag portion) of the far-side airbag device is deployed and inflated between the abdomen portion of the occupant and a console box. Therefore, when the lower portion of the airbag comes into contact with the console box, the console box restricts the lower portion of the airbag from further moving toward the side wall portion to which the impact is applied. A position of a portion of the airbag that is lower than an upper surface of the console box is stabilized.

Therefore, the upper body of the occupant is easily received by a portion of the airbag above the upper surface of the console box, and the performance of protecting the occupant from an impact is enhanced.

Words in parentheses following member names indicate the member names used in JP2014-69729A.

SUMMARY OF INVENTION

In recent years, in addition to preventing an upper body of an occupant from moving when an impact is applied to a side wall portion from a lateral side or an oblique front side, there is a demand for preventing a head portion from rotating around an axis of a neck portion.

However, the far-side airbag device described in JP2014-69729A is designed mainly for preventing an upper body of an occupant from moving, and does not consider the point of preventing the rotation of a head portion.

Therefore, in the far-side airbag device described in JP2014-69729A, there is room for improvement in terms of enhancing the performance of protecting a head portion of an occupant from impact.

To solve the above problem, there is provided a far-side airbag device configured to be applied to a vehicle in which a plurality of vehicle seats are arranged in parallel in a width direction of the vehicle seats, portions on both sides in the width direction are constituted by a pair of side wall portions, and a console box is disposed between the vehicle seats that are adjacent to each other, wherein when it is detected that an impact is applied or when an impact is predicted to be applied to the specific side wall portion from a lateral side or an oblique front side of the vehicle seat with one of the side wall portions as a specific side wall portion, an airbag is deployed and inflated between the adjacent vehicle seats by an inflation gas, the airbag includes an upper inflation portion having a portion deployed and inflated on a lateral side of a head portion of an occupant seated in the vehicle seat on a side farther from the specific side wall portion, and a lower inflation portion in which a portion including at least a lower end of the lower inflation portion is deployed and inflated between the console box and the occupant, and in the upper inflation portion, the portion positioned on the lateral side of the head portion is deployed and inflated such that a dimension in the width direction increases toward a front side.

According to the above configuration, when an impact is applied to the specific side wall portion from the lateral side or the oblique front side of the vehicle seat, an upper body including the head portion of the occupant seated in the vehicle seat on the side farther from the specific side wall portion moves toward the specific side wall portion due to inertia.

On the other hand, when it is detected that an impact is applied or when an impact is predicted to be applied to the specific side wall portion from the lateral side or the oblique front side of the vehicle seat, the inflation gas is supplied to the airbag, and the airbag is deployed and inflated between the adjacent vehicle seats.

Here, the portion including at least the lower end of the lower inflation portion of the airbag is deployed and inflated between the console box and the occupant. A portion of the lower inflation portion that enters a gap between the console box and the occupant comes into contact with the console box. The portion of the lower inflation portion is restricted from further moving toward the specific side wall portion by the console box, and a position of the portion is stabilized.

Accordingly, a portion of the airbag above the console box is less likely to move toward the specific side wall portion. The upper portion of the airbag has a high performance of receiving the upper body of the occupant moving toward the specific side wall portion. This performance also includes the performance of the upper inflation portion to receive the head portion.

As described above, when the upper body of the occupant including the head portion moves toward the specific side wall portion due to inertia, the head portion rotates about an axis of a neck portion. A direction of the rotation is a direction in which a front head portion approaches the specific side wall portion and a rear head portion moves away from the specific side wall portion.

In this regard, according to the above configuration, the upper inflation portion is deployed and inflated on the lateral side of the head portion. The portion of the upper inflation portion positioned on the lateral side of the head portion is deployed and inflated such that the dimension in the width direction increases toward a front side. Of the above portion of the upper inflation portion, a portion in front of the axis of the neck portion approaches the front head portion. The front head portion comes into contact with the front portion at an earlier stage. Then, the rotation of the head portion is restricted at an early stage by the friction generated by the contact.

In the far-side airbag device, it is preferable that the airbag further includes an upper auxiliary inflation portion that is deployed and inflated in front of the head portion.

According to the above configuration, at least a part of the upper inflation portion of the airbag is deployed and inflated on the lateral side of the head portion of the occupant seated in the vehicle seat, and the upper auxiliary inflation portion is deployed and inflated in front of the head portion. The upper inflation portion restricts the movement of the head portion to the lateral side or the oblique front side and the rotation of the head portion about the axis of the neck portion. The upper auxiliary inflation portion restricts the movement of the head portion toward the front or the oblique front side. Since the movement of the head portion is restricted by the upper auxiliary inflation portion, the performance of the airbag protecting the head portion from impact is further improved.

According to the above far-side airbag device, it is possible to improve the performance of protecting a head portion of an occupant from impact.

DESCRIPTION OF EMBODIMENTS

Hereinafter, a far-side airbag device for a wheeled vehicle according to an embodiment will be described with reference to FIGS. 1 to 4.

In the following description, a forward direction of a wheeled vehicle is described as a front side, and a backward direction is described as a rear side. An upper-lower direction refers to an upper-lower direction of the wheeled vehicle, and a left-right direction is a width direction of the wheeled vehicle and coincides with a left-right direction of the wheeled vehicle when the wheeled vehicle moves forward. It is assumed that an occupant having the same physique as that of a crash test dummy is seated in a wheeled vehicle seat.

Figure 1:
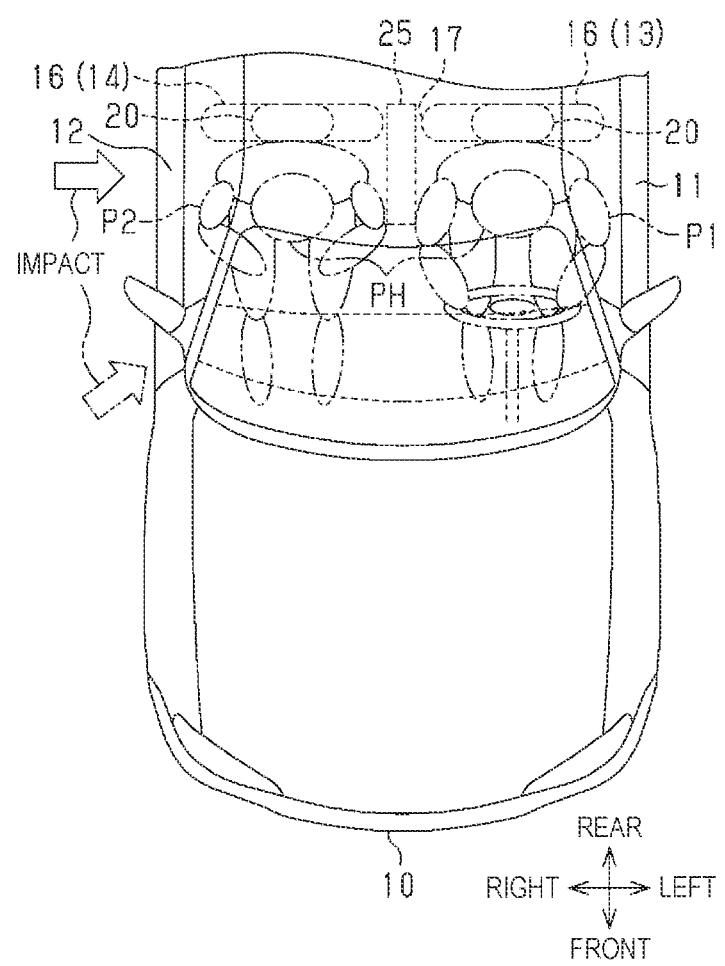
FIG. 1 is a partial plan view of a wheeled vehicle to which a far-side airbag device is applied in an embodiment.

As shown in FIG. 1, two side portions of a wheeled vehicle 10 in a left-right direction are constituted by a pair of side wall portions 11 and 12 including doors, pillars, and the like. In a wheeled vehicle interior, wheeled vehicle seats 13 and 14 as front seats are arranged in parallel in the left-right direction. The wheeled vehicle seat 13 close to the side wall portion 11 functions as a driver seat, and an occupant (driver) P1 is seated in the wheeled vehicle seat 13. The wheeled vehicle seat 14 close to the side wall portion 12 functions as a front passenger seat, and an occupant (front passenger seat occupant) P2 is seated in the w % heeled vehicle seat 14. A console box (also referred to as a center console, a floor console, or the like) 25 functioning as a box-shaped storage portion is disposed between the wheeled vehicle seats 13 and 14 in the wheeled vehicle interior. The wheeled vehicle seats 13 and 14 have the same configuration. Therefore, only the wheeled vehicle seat 13 will be described here.

<Schematic Configuration of Wheeled Vehicle Seat 13>

Figure 2:
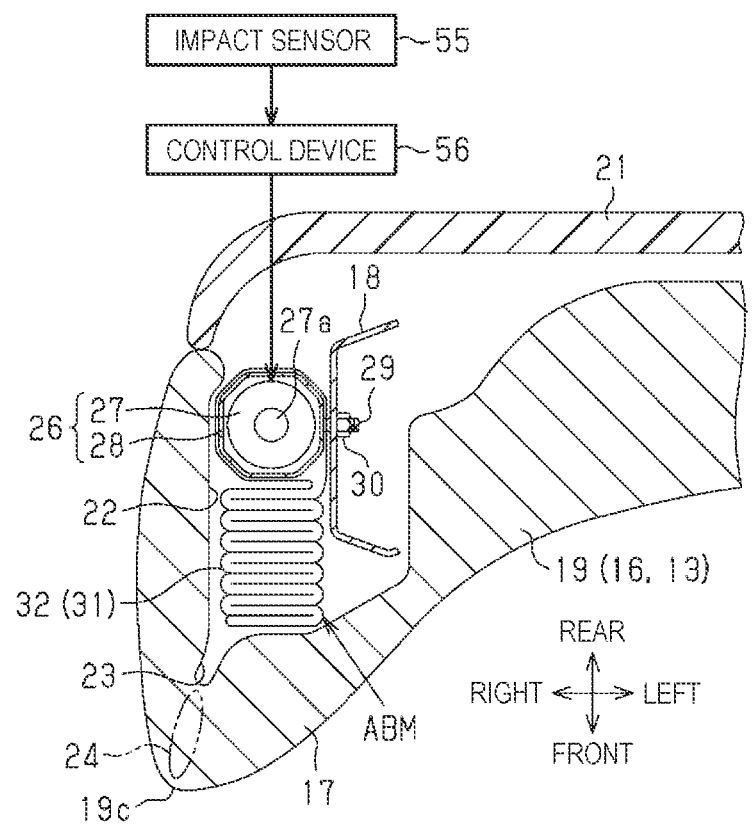
FIG. 2 is a partial cross-sectional plan view showing an internal structure of a side portion of a seat back in which an airbag module is stored in the embodiment.
Figure 3:
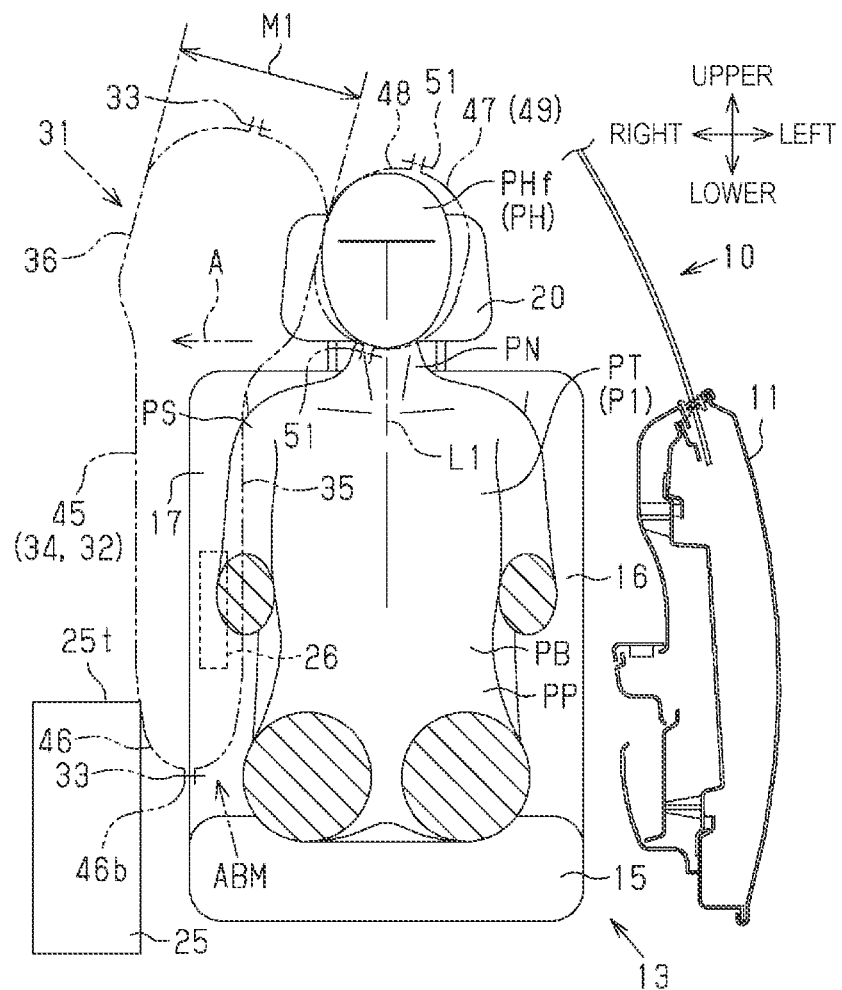
FIG. 3 is a partial cross-sectional view of a side wall portion, a wheeled vehicle seat, an airbag, a console box, and an occupant, as viewed from the front of the wheeled vehicle in the embodiment.

As shown in FIGS. 2 and 3, the wheeled vehicle seat 13 includes a seat cushion 15, a seat back 16, and a headrest 20. The seat cushion 15 is a portion on which the occupant P1 is seated, and is slidable in a front-rear direction. The seat back 16 supports an upper body of the occupant P1 from a rear side. The seat back 16 stands upright from a rear portion of the seat cushion 15, and an inclination angle thereof can be adjusted. The headrest 20 supports a head portion PH of the occupant P1 from the rear side, and is disposed on the seat back 16. The wheeled vehicle seat 13 is disposed in a posture in which the seat back 16 faces a front side of a wheeled vehicle. A width direction of the wheeled vehicle seat 13 disposed in this manner coincides with the left-right direction of the wheeled vehicle 10.

FIG. 2 shows an internal structure of a side portion 17 of the seat back 16 on a side close to the wheeled vehicle seat 14. A seat frame constituting a framework portion of the seat back 16 is disposed inside the seat back 16.

A side frame portion 18 constituting a part of the seat frame is disposed inside the side portion 17. The side frame portion 18 is formed by bending a metal plate or the like.

A seat pad 19 made of an elastic material such as urethane foam is disposed on a front side of the seat frame including the side frame portion 18. A backboard 21 made of synthetic resin or the like is disposed on a rear side of the seat frame. Although the seat pad 19 is covered with a cover, the cover is not shown in FIG. 2.

A storage portion 22 is provided inside the side portion 17 at a position closer to the wheeled vehicle seat 14 than the side frame portion 18. The storage portion 22 is a space in which an airbag module ABM, which is a main part of the far-side airbag device, is stored.

A slit 23 extends from a corner portion of a front portion of the storage portion 22 toward an oblique front side on the wheeled vehicle seat 14. A portion sandwiched between a front corner portion 19c of the seat pad 19 and the slit 23 (a portion surrounded by a two-dot chain line in FIG. 2) constitutes a breakable portion 24 to be broken by an airbag 31 to be described later.

The airbag module ABM includes, as main components, the airbag 31 and a gas generator 26 that supplies inflation gas to the airbag 31. Next, these components will be described.

<Gas Generator 26>

The gas generator 26 includes an inflator 27 and a retainer 28 that covers the inflator 27. Here, a pyrotechnic type inflator is used as the inflator 27. The inflator 27 has a substantially cylindrical shape, and a gas generating agent (not shown) that generates inflation gas is accommodated in the inflator 27. The inflator 27 includes a gas ejection portion 27a at one end thereof. The other end of the inflator 27 is connected to a harness (not shown) serving as an input wire for inputting an actuation signal to the inflator 27.

Instead of the pyrotechnic type inflator using a gas generating agent, the inflator 27 may be of a type in which a partition wall of a high-pressure gas cylinder filled with high-pressure gas is broken by an explosive or the like to eject inflation gas.

On the other hand, the retainer 28 is a member that functions as a diffuser that controls a direction in which the inflation gas is ejected, and has a function of fastening the inflator 27 to the side frame portion 18 together with the airbag 31 and the like. Most of the retainer 28 is formed in a substantially cylindrical shape by bending a plate material such as a metal plate. A bolt 29 is fixed to the retainer 28 as a member for attaching the retainer 28 to the side frame portion 18.

In the gas generator 26, the inflator 27 and the retainer 28 may be integrated. The gas generator 26 may include only the inflator 27 without using the retainer 28. In this case, the bolt 29 is fixed to the inflator 27.

<Airbag 31>

Figure 4:
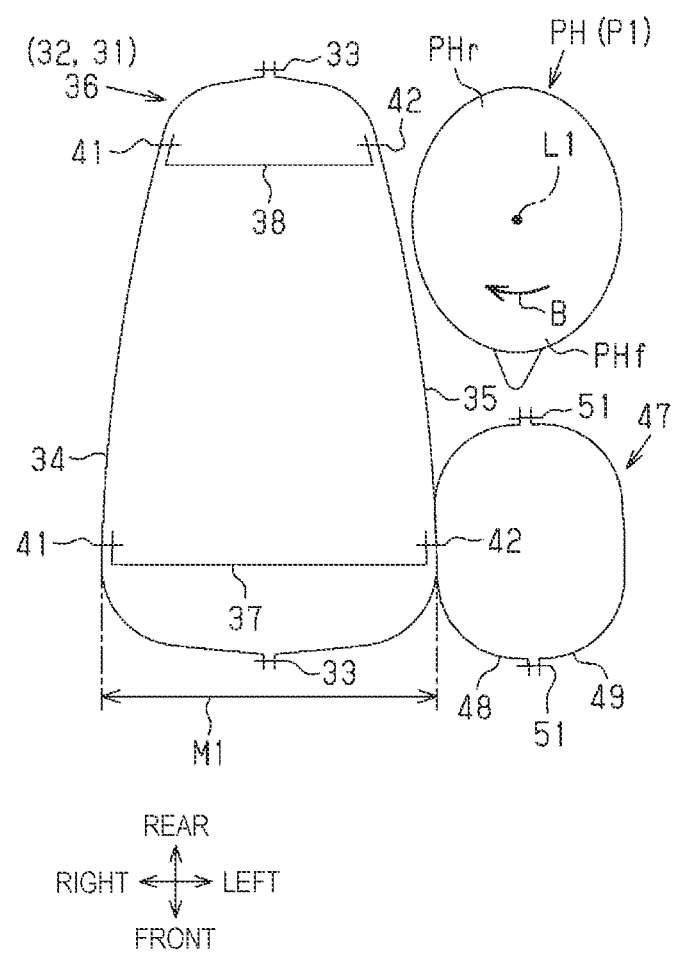
FIG. 4 is a plan sectional view showing the deployed and inflated airbag together with a head portion of the occupant in the embodiment.

As shown in FIGS. 3 and 4, the airbag 31 includes an inflation portion 32 and an upper auxiliary inflation portion 47 having a smaller capacity than the inflation portion 32. Both the inflation portion 32 and the upper auxiliary inflation portion 47 are formed of a fabric piece (also referred to as a base fabric, a panel fabric, or the like). As the fabric piece, a material having high strength and flexibility that can be easily folded, for example, a woven fabric formed of polyester yarns, polyamide yarns, or the like is used.

<Inflation Portion 32>

The inflation portion 32 is formed, for example, by folding a fabric piece in half along a folding line and overlapping the two pieces in the left-right direction, and joining portions of the overlapped portions that are different from the folding line with peripheral joint portions 33. Here, to distinguish between the two overlapped portions of the inflation portion 32, a portion farther from the occupant P1 is referred to as a fabric portion 34, and a portion close to the occupant P1 is referred to as a fabric portion 35.

The inflation portion 32 may be formed of two fabric pieces. In this case, the inflation portion 32 is formed by overlapping two fabric pieces in the left-right direction and joining the two fabric pieces over the entire circumference with the peripheral joint portions 33.

Although the peripheral joint portion 33 is formed by sewing, the peripheral joint portion 33 may be formed by other methods, for example, adhesion. The same applies to joint portions 41 and 42, auxiliary peripheral joint portions 51, and annular joint portions, which will be described later.

The inflation portion 32 includes an upper inflation portion 36, an intermediate inflation portion 45, and a lower inflation portion 46.

The upper inflation portion 36 takes the head portion PH of the occupant P1 as a protection target portion. At least a part of the upper inflation portion 36 has a shape and a size that can be deployed and inflated on a lateral side of the protection target portion. In the present embodiment, the upper inflation portion 36 has a shape and a size that can be deployed and inflated not only on one side of the head portion PH in the front-rear direction but also on an oblique front side of the head portion PH (see FIG. 4).

The upper inflation portion 36 is deployed and inflated in an inclined state so as to approach the head portion PH as going upward. The deployment and inflation are performed by, for example, a tether (not shown) disposed inside the inflation portion 32 and formed of a belt-shaped fabric piece. An end of the tether farther from the occupant P1 is joined to the fabric portion 34. An end of the tether closer to the occupant P1 is joined to the fabric portion 35 at a position lower than a joint position of the tether with the fabric portion 34.

When the upper inflation portion 36 is completely deployed and inflated, a portion of the upper inflation portion 36 closer to the occupant P1, that is, a portion of the fabric portion 35 above a shoulder portion PS of the occupant P1, is positioned between the shoulder portion PS and the head portion PH in the left-right direction.

As shown in FIG. 4, belt-shaped tethers 37 and 38 extending in the left-right direction are disposed at a plurality of positions (two positions in the present embodiment) spaced apart from one another in the front-rear direction in the upper inflation portion 36. The tethers 37 and 38 are formed of the same material as the inflation portion 32 and the upper auxiliary inflation portion 47. Right ends of the tethers 37 and 38 are joined to the fabric portion 34 by the joint portions 41, and left ends of the tethers 37 and 38 are joined to the fabric portion 35 by the joint portions 42. The tethers 37 and 38 extend between the fabric portions 34 and 35.

As the upper inflation portion 36 is deployed and inflated, the tethers 37 and 38 are pulled to two sides in the left-right direction to be in a tensioned state, thereby regulating a dimension (inflation thickness) M1 of the upper inflation portion 36 in the left-right direction.

In the present embodiment, the front tether 37 has a larger (longer) dimension in the left-right direction than the rear tether 38. Therefore, a portion of the upper inflation portion 36 positioned on the lateral side of the head portion PH is deployed and inflated such that the dimension M1 in the left-right direction increases toward the front side.

The tethers 37 and 38 may be disposed at positions separated from each other in the front-rear direction at the same height. The tethers 37 and 38 may be disposed at positions separated from each other in the front-rear direction at different heights. Further, the tethers 37 and 38 may be disposed at a plurality of positions separated from one another in the front-rear direction at a plurality of different heights.

As shown in FIG. 3, the intermediate inflation portion 45 is adjacent to a lower side of the upper inflation portion 36. The intermediate inflation portion 45 takes a region from the shoulder portion PS to an abdomen portion PB of the occupant P1 as a protection target portion, and has a shape and a size that can be deployed and inflated on a lateral side of the protection target portion.

The lower inflation portion 46 is adjacent to a lower side of the intermediate inflation portion 45. The lower inflation portion 46 takes a region of the occupant P1 mainly from a lumbar portion PP to the abdomen portion PB as a protection target portion, and has a shape and a size that can be deployed and inflated on a lateral side of the protection target portion.

The lower inflation portion 46 is deployed and inflated such that a lower end 46*b* of the lower inflation portion 46 is positioned between the console box 25 and the occupant P1 and below an upper surface 25*t* of the console box 25.

Here, a gap between the console box 25 and the occupant P1 is narrow in the first place. In addition, when an impact is applied to the side wall portion 12 from a lateral side or an oblique front side, the upper body of the occupant P1 moves toward the side wall portion 12 due to inertia. Therefore, the gap becomes narrower as time elapses. If the deployment and inflation of the lower inflation portion 46 is slow, it becomes difficult for the lower inflation portion 46 to enter the gap.

Therefore, in an initial stage of the deployment and inflation of the inflation portion 32, the lower inflation portion 46 is made to be easily inserted into the gap. In the present embodiment, an inner tube (not shown) that preferentially supplies the inflation gas ejected from the gas ejection portion 27a to the lower inflation portion 46 is provided inside the inflation portion 32.

As will be described later, the airbag 31 is folded into a form (storage form) suitable for storage. As an aspect of the folding, the lower inflation portion 46 is folded back so as to enter the inside of an upper portion of the lower inflation portion 46, that is, the lower inflation portion 46 is folded inward (also referred to as center folding).

As shown in FIG. 2, the gas generator 26 is disposed in a rear end portion of the inflation portion 32 in a posture extending substantially in the upper-lower direction. Further, the bolt 29 is inserted into the fabric portion 35, whereby the gas generator 26 is locked in a state of being positioned with respect to the inflation portion 32.

<Upper Auxiliary Inflation Portion 47>

As shown in FIGS. 3 and 4, the upper auxiliary inflation portion 47 is disposed adjacent to a front portion of the fabric portion 35 in the upper inflation portion 36. The upper auxiliary inflation portion 47 takes the head portion PH of the occupant P1 as a protection target portion, and has a shape and a size that can be deployed and inflated in front of the protection target portion.

As shown in FIG. 4, the upper auxiliary inflation portion 47 includes an auxiliary fabric portion 48 adjacent to the front portion of the fabric portion 35, and an auxiliary fabric portion 49 disposed on an opposite side of the fabric portion 35 with the auxiliary fabric portion 48 interposed therebetween. The auxiliary fabric portions 48 and 49 may be formed of separate fabric pieces or may be formed by bending a single fabric piece. A peripheral edge portion of the auxiliary fabric portion 48 and a peripheral edge portion of the auxiliary fabric portion 49 are overlapped and joined by the auxiliary peripheral joint portion 51.

The upper auxiliary inflation portion 47 is connected to the inflation portion 32 (upper inflation portion 36) in a communicating state. Although not shown, the fabric portion 35 is formed with a communication hole portion that communicates the inside and the outside of the inflation portion 32 (upper inflation portion 36). The auxiliary fabric portion 48 is formed with an auxiliary communication hole portion that communicates the inside and the outside of the upper auxiliary inflation portion 47. Shapes of the communication hole portion and the auxiliary communication hole portion are not limited. The shape may be a circular shape, a polygonal shape, an elliptical shape, or the like, or may be an elongated hole, a slit, or the like. A peripheral portion of the communication hole portion in the fabric portion 35 and a peripheral portion of the auxiliary communication hole portion in the auxiliary fabric portion 48 are overlapped and joined by an annular joint portion (not shown).

As shown in FIG. 2, the airbag module ABM has a compact storage form by folding a portion of the inflation portion 32 in front of a portion (rear end portion) in which the gas generator 26 is stored together with the tethers 37 and 38, the upper auxiliary inflation portion 47, and the like. As an aspect of the folding, the lower inflation portion 46 is folded inward as described above. In FIG. 2, a portion of the airbag 31 that is different from the inflation portion 32, for example, the upper auxiliary inflation portion 47, is not shown.

The airbag module ABM in a storage form is stored in the storage portion 22. The bolt 29 penetrating the fabric portion 35 of the inflation portion 32 is inserted into the side frame portion 18 from the wheeled vehicle seat 14 side. A portion of the bolt 29 protrudes further away from the wheeled vehicle seat 14 than the side frame portion 18, and a nut 30 is fastened to the protruding portion. Due to this fastening, the gas generator 26 is fixed to the side frame portion 18 together with the inflation portion 32.

The gas generator 26 may be fixed to the side frame portion 18 by a member different from the bolt 29 and the nut 30 described above. When the gas generator 26 includes only the inflator 27, the inflator 27 may be fixed to the side frame portion 18 by a bolt fixed to the inflator 27 and the nut 30.

<Other Configurations of Far-Side Airbag Device>

The far-side airbag device includes an impact sensor 55 and a control device 56 in addition to the airbag module ABM described above. The impact sensor 55 includes an acceleration sensor or the like, and is disposed on the side wall portions 11 and 12 or the like to detect an impact applied to the side wall portions 11 and 12 from the lateral side and the oblique front side.

The control device 56 is implemented by a circuit including one or more processors that operate in accordance with a computer program (software), one or more dedicated hardware circuits that execute at least a part of various types of processing, or a combination thereof. The control device 56 controls the actuation of the gas generator 26 based on a detection signal from the impact sensor 55. In the present embodiment, when the impact sensor 55 detects that an impact is applied to one of the pair of side wall portions 11 and 12 from the lateral side or the oblique front side, the control device 56 outputs an actuation signal to the gas generator 26 to actuate the gas generator 26.

A seatbelt device (not shown) for restraining the occupant P1 seated in the wheeled vehicle seat 13 to the wheeled vehicle seat 13 is provided in the wheeled vehicle interior. Next, an operation of the present embodiment configured as described above will be described. Effects produced by the operation will also be described. As a precondition, it is assumed that the occupant P1 is seated in the wheeled vehicle seat 13 in an appropriate posture, and the occupant P1 is restrained to the wheeled vehicle seat 13 by the seatbelt device.

<(1) at Time of Non-Actuation of Far-Side Airbag Device>

When the impact sensor 55 detects that no impact of a predetermined value or more is applied to the side wall portions 11 and 12 from the lateral side or the oblique front side while the wheeled vehicle 10 is traveling, the control device 56 does not output an actuation signal to the gas generator 26. The inflation gas is not ejected from the gas ejection portion 27a of the inflator 27. As shown in FIG. 2, the airbag module ABM continues to be stored in the storage portion 22 in a storage form.

<(2) At Time of Actuation of Far-Side Airbag Device>

Next, a case will be described in which one of the side wall portions 11 and 12, for example, the side wall portion 12 is a specific side wall portion and an impact is applied to the side wall portion 12 when the wheeled vehicle 10 is traveling. A direction in which the impact is applied may be a lateral side as indicated by a solid line arrow in FIG. 1, or an oblique front side as indicated by a two-dot chain line arrow in FIG. 1.

In this case, the upper body of the occupant P1 including the head portion PH on the driver seat side, which is the side farther from the side wall portion 12 to which the impact is applied, moves toward the side wall portion 12 to which the impact is applied due to inertia, as indicated by a two-dot chain line arrow A in FIG. 3. The movement also includes a movement of falling toward the side wall portion 12.

In response to this, when the impact sensor 55 in FIG. 2 detects that an impact of a predetermined value or more is applied to the side wall portion 12, the control device 56 outputs the actuation signal to the gas generator 26 in response to the detection signal. In response to the actuation signal, the inflation gas is ejected from the gas ejection portion 27a of the inflator 27. In the airbag module ABM in a storage form, the inflation gas is first supplied to the inflation portion 32 in which the gas generator 26 is disposed. The inflation gas increases an internal pressure of the inflation portion 32. The inflation portion 32 is inflated while being unfolded, that is, while being deployed.

During the deployment and inflation, the inflation portion 32 presses the seat pad 19 near the storage portion 22 in FIG. 2 together with the upper auxiliary inflation portion 47 and the like, and breaks the seat pad 19 at the breakable portion 24. Thereafter, as the inflation gas continues to be supplied, the inflation portion 32 exits to the outside of the storage portion 22 together with the upper auxiliary inflation portion 47 and the like through the broken portion in a state in which a portion fixed to the side frame portion 18 is left in the storage portion 22.

In the inflation portion 32 exiting out of the wheeled vehicle seat 13, the inflation gas flows in both upper and lower directions. The inflation portion 32 is deployed and inflated in both upper and lower directions between the wheeled vehicle seats 13 and 14, that is, on a lateral side of the upper body of the occupant P1, as shown in FIG. 3. More specifically, the inflation gas flowing downward deploys and inflates the lower inflation portion 46 on lateral sides of the abdomen portion PB, the lumbar portion PP, and the like of the occupant P1. The inflation gas flowing upward deploys and inflates the intermediate inflation portion 45 on lateral sides of a thorax portion PT, the shoulder portion PS, and the like of the occupant P1. Further, the upper inflation portion 36 is deployed and inflated on the lateral side of the head portion PH of the occupant P1.

The inflation portion 32 is pressed by the upper body of the occupant P1 moving toward the side wall portion 12. Due to this pressing, the inflation portion 32 tilts toward the wheeled vehicle seat 14 with the fixed portion with respect to the side frame portion 18 as a fulcrum.

(2-1) In this regard, when the lower inflation portion 46 is deployed and inflated, a portion of the lower inflation portion 46 including at least the lower end 46b is deployed and inflated between the console box 25 and the occupant P1. When the lower inflation portion 46 is completely deployed and inflated, a portion of the lower inflation portion 46 that is lower than the upper surface 25t of the console box 25 enters between the console box 25 and the occupant P1. The above portions of the lower inflation portion 46 are restricted by the console box 25 from further moving toward the side wall portion 12 by coming into contact with the console box 25. A position of the portion of the lower inflation portion 46 that is lower than the upper surface 25t is stabilized. A portion of the airbag 31 above the console box 25 is less likely to move toward the side wall portion 12. This portion enhances the performance of receiving an upper body of the occupant P1 moving toward the side wall portion 12. This performance also includes the performance of the upper inflation portion 36 to receive the head portion PH.

(2-2) In the inflation portion 32, inflation gas is preferentially supplied to the lower inflation portion 46 by an inner tube as described above. Therefore, after the supply of the inflation gas is started, an internal pressure of the lower inflation portion 46 increases in a relatively short time, and the lower inflation portion 46 starts to be deployed and inflated. The lower inflation portion 46 easily enters a narrow gap between the console box 25 and the occupant P1.

As described above, since the lower inflation portion 46 is folded inward, a pressure of the inflation gas acts on an inward folded portion at an early stage, and the inward folded portion is pushed out. The lower inflation portion 46 is more likely to be unfolded than in the case of being folded in another mode. When unfolded, the lower inflation portion 46 is quickly deployed and inflated. In this regard, the lower inflation portion 46 easily enters the narrow gap between the console box 25 and the occupant P1.

Therefore, the above effect (2-1) of receiving the upper body of the occupant P1 moving toward the side wall portion 12 is more easily obtained. The movement of the upper body including the head portion PH toward the side wall portion 12 is prevented, and the performance of the far-side airbag device that protects the upper body from impact is enhanced.

Here, as described above, when the upper body of the occupant P1 including the head portion PH is about to move toward the side wall portion 12 due to inertia, the head portion PH of the occupant P1 is about to rotate about an axis L1 of the neck portion PN as indicated by an arrow B in FIG. 4. A direction of the rotation is a direction in which a front head portion PHf approaches the side wall portion 12 and a rear head portion PHr moves away from the side wall portion 12. In plan view, the head portion PH is about to rotate in the clockwise direction in FIG. 4.

(2-3) In this regard, in the present embodiment, a portion of the upper inflation portion 36 is deployed and inflated at a position on a lateral side of the side wall portion 12 with respect to the head portion PH.

In addition, when the deployment and inflation are completed, the upper inflation portion 36 is inclined so as to approach the head portion PH as going upward. A portion of the upper inflation portion 36 closer to the head portion PH (fabric portion 35) is positioned between the shoulder portion PS of the occupant P1 and the head portion PH in the left-right direction.

Therefore, a portion of the fabric portion 35 of the upper inflation portion 36, which is positioned in front of the axis L1 of the neck portion PN, is positioned near the front head portion PHf. The front head portion PHf comes into contact with the fabric portion 35 at an early stage. The head portion PH is received by the upper inflation portion 36 and is restricted from moving toward the lateral side. Due to the restriction, the head portion PH is restrained and is protected from impact.

Further, as the upper inflation portion 36 is deployed and inflated, the fabric portions 34 and 35 expand toward both sides in the left-right direction. However, as the fabric portions 34 and 35 move as described above, the tethers 37 and 38 extending between the fabric portions 34 and 35 are pulled to both sides in the left-right direction. When the tethers 37 and 38 are tensed, further inflation of portions of the fabric portions 34 and 35 to which the tethers 37 and 38 are joined is restricted.

In the present embodiment, the front tether 37 has a larger (longer) dimension in the left-right direction than the rear tether 38. Therefore, a portion of the upper inflation portion 36 positioned on the lateral side of the head portion PH is deployed and inflated such that the dimension M1 in the width direction increases toward the front side.

When the deployment and inflation are completed, in the above portion of the upper inflation portion 36, a portion in front of the axis L1 of the neck portion PN approaches the front head portion PHf. The front head portion PHf comes into contact with the fabric portion 35 at the front portion at an earlier stage. Then, the rotation of the head portion PH is restricted at an early stage by the friction generated by the contact. The performance of protecting the head portion PH is enhanced by the airbag 31.

(2-4) The inflation portion 32 (upper inflation portion 36) and upper auxiliary inflation portion 47 communicate with each other via a communication hole portion and an auxiliary communication hole portion. Therefore, part of the inflation gas supplied to the inflation portion 32 flows into the upper auxiliary inflation portion 47 through the communication hole portion and the auxiliary communication hole portion while the upper inflation portion 36 is deployed and inflated.

As shown in FIGS. 3 and 4, the inflation gas flowing in as described above deploys and inflates the upper auxiliary inflation portion 47 in front of the head portion PH of the occupant P1.

Therefore, when an impact is applied to the side wall portion 12 from an oblique front side, the upper body of the occupant P1 including the head portion PH moves to the side to which the impact is applied, but the head portion PH is received by the upper auxiliary inflation portion 47, and the head portion PH can be protected from the impact.

Therefore, since the movement of the head portion PH is restricted by the upper auxiliary inflation portion 47, the performance of the airbag 31 to protect the head portion PH from impact is further improved.

Although a case in contrast to the above embodiment will not be described, in which the side wall portion 11 in FIG. 1 is a specific side wall portion and an impact is applied to the side wall portion 11 from a lateral side or an oblique front side, the same operation as described above is performed. The occupant P2 seated in the wheeled vehicle seat 14 is protected from the impact.

According to the present embodiment, the following effects can be obtained in addition to the above effects.

(3-1) When an impact is applied to the wheeled vehicle 10 from the front due to a frontal crash or the like, the upper body of the occupant P1 including the head portion PH moves to the side to which the impact is applied, but the head portion PH is received by the upper auxiliary inflation portion 47, and the head portion PH can be protected from the impact.

Therefore, in this regard as well, the performance of the airbag 31 to protect the head portion PH from impact is further improved.

The above embodiment can also be implemented as modifications which are modified as follows. The above embodiment and the following modifications can be implemented in combination with each other within a technically consistent range.

<Airbag 31>

The lower inflation portion 46 may be deployed and inflated such that a dimension in the left-right direction decreases toward a lower side. In this way, the lower inflation portion 46 easily enters the narrow gap between the console box 25 and the occupant P1.

The inflation portion 32 may be substantially entirely inflated as in the above embodiment, and may partially include a non-inflation portion to which inflation gas is not supplied and which is not inflated.

Figure 5:
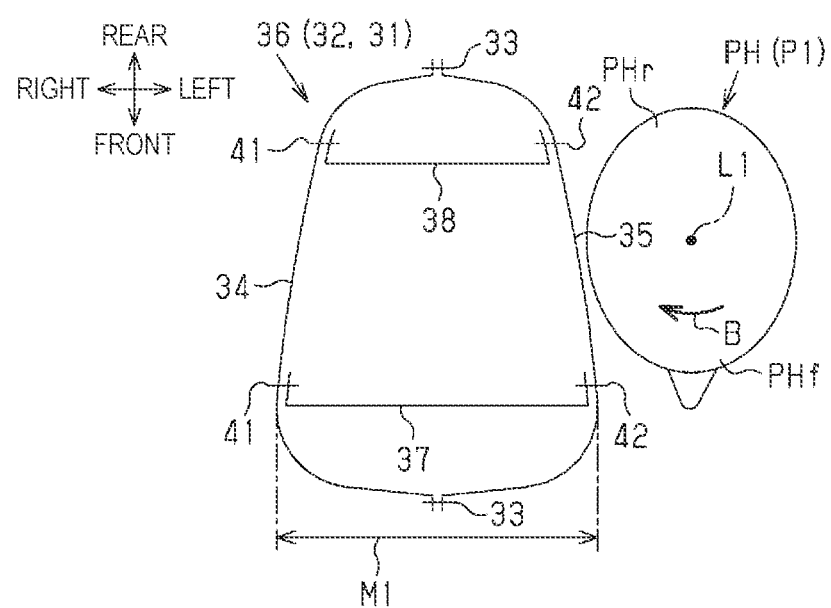
FIG. 5 is a view showing a modification of the airbag, and is a plan sectional view showing a deployed and inflated airbag together with a head portion of an occupant.

As shown in FIG. 5, the upper auxiliary inflation portion 47 may be omitted from the airbag 31. In this case, a dimension of the upper inflation portion 36 in the front-rear direction is smaller than that in the above embodiment. However, as in the above embodiment, it is possible to obtain an effect of preventing the rotation of the head portion PH about the axis L1 of the neck portion PN.

In the upper inflation portion 36, a dimension in the width direction has no restriction that the dimension in the width direction increases toward the front side at a portion deviated from a lateral side of the head portion PH in the front-rear direction.

<Control Device 56>

A control specification of the control device 56 may be changed to a specification for outputting an actuation signal to the gas generator 26 when an impact is predicted to be applied to the wheeled vehicle 10 from the outside. In this case, the outside includes a front side in addition to the lateral side and the oblique front side.

<Application Place of Far-Side Airbag Device>

The far-side airbag device may be applied not only to front seats (driver seat, front passenger seat) of the wheeled vehicle 10 but also to rear seats (seats in the second and subsequent rows).

In a case of a wheeled vehicle of a type in which wheeled vehicle seats are disposed in a posture in which the seat back 16 faces a direction different from the front of the wheeled vehicle, for example, a lateral side, the far-side airbag device is also applicable to these wheeled vehicle seats.

In a case of a wheeled vehicle of a type in which three or more wheeled vehicle seats are arranged in parallel in a width direction, the far-side airbag device is also applicable to these wheeled vehicle seats.

Others

Wheeled vehicles to which the above far-side airbag device is applied not only includes private cars but also includes various industrial wheeled vehicles.

The above far-side airbag device is also applicable as a far-side airbag device mounted on a vehicle seat in a vehicle different from a wheeled vehicle, for example, an aircraft or a ship.

In addition, technical ideas that can be understood from the above embodiments will be described together with the effects thereof.

(A) The far-side airbag device according to the embodiment, in which the lower inflation portion is inflated such that the dimension in the width direction decreases toward a lower side.

According to the above configuration, when the dimension (inflation thickness) of the lower inflation portion in the width direction is smaller toward the lower side, the lower inflation portion easily enters between the console box and the occupant.

(B) The far-side airbag device according to the embodiment, in which when the upper inflation portion is completely deployed and inflated, a fabric portion of the upper inflation portion on a side close to the occupant is positioned between a shoulder portion and a head portion of the occupant in the width direction.

According to the above configuration, when the upper inflation portion is completely deployed and inflated, the fabric portion of the upper inflation portion on a side close to the occupant approaches the head portion of the occupant. Therefore, in the upper inflation portion, of a portion positioned on a lateral side of the head portion, a portion positioned in front of an axis of the neck portion is closer to a front head portion. The front head portion comes into contact with the front portion at an earlier stage.

(C) The far-side airbag device according to the embodiment, in which a plurality of belt-shaped tethers extending in the width direction extend between the fabric portion of the upper inflation portion on the side closer to the occupant and a fabric portion of the upper inflation portion on a side farther from the occupant at a plurality of positions separated from one another in the front-rear direction, and the tethers positioned on a front side have a larger dimension in the width direction.

According to the above configuration, as the upper inflation portion is deployed and inflated, each of the tethers is pulled toward both sides in the width direction to be in a tensioned state, thereby regulating a dimension (inflation thickness) of the upper inflation portion in the width direction. By using tethers that satisfy the above conditions in terms of the dimension in the width direction as the plurality of tethers, the portion of the upper inflation portion positioned on the lateral side of the head portion is inflated such that the dimension in the width direction increases toward the front side.

What is claimed is:

1. A far-side airbag device configured to be applied to a vehicle in which a plurality of vehicle seats are arranged in parallel in a width direction of the vehicle seats, portions on both sides in the width direction are constituted by a pair of side wall portions, and a console box is disposed between the vehicle seats that are adjacent to each other, wherein
   when it is detected that an impact is applied or when an impact is predicted to be applied to a specific side wall portion from a lateral side or an oblique front side of a vehicle seat of the vehicle seats with one of the side wall portions as the specific side wall portion, an airbag is deployed and inflated between the adjacent vehicle seats by an inflation gas,
   the airbag includes an upper inflation portion having a portion configured and adapted so as to be deployed and inflated on a lateral side of a head portion of an occupant seated in the vehicle seat on a side farther from the specific side wall portion, and a lower inflation portion in which a portion including at least a lower end of the lower inflation portion is configured and adapted so as to be deployed and inflated between the console box and the occupant, and
   in the upper inflation portion, the portion configured and adapted so as to be positioned on the lateral side of the head portion is deployed and inflated such that a dimension in the width direction continuously increases toward a front side.

2. The far-side airbag device according to claim 1, wherein
   the airbag further includes an upper auxiliary inflation portion that is configured and adapted so as to be deployed and inflated in front of the head portion.

3. The far-side airbag device according to claim 1, wherein
   the lower inflation portion is inflated such that a dimension of the lower inflation portion in the width direction decreases toward a lower side of the lower inflation portion.

4. The far-side airbag device according to claim 1, wherein
   when the upper inflation portion is completely deployed and inflated, a fabric portion of the upper inflation portion disposed so as to be on a side close to the occupant is configured and adapted so as to be positioned between a shoulder portion and a head portion of the occupant in the width direction.

5. The far-side airbag device according to claim 1, further comprising:
   a plurality of belt-shaped tethers extending in the width direction configured and adapted so as to extend between the fabric portion of the upper inflation portion on the side closer to the occupant and a fabric portion of the upper inflation portion on a side farther from the occupant at a plurality of positions separated from one another in a front-rear direction, wherein
   the plurality of belt-shaped tethers include tethers positioned on a front side and a tether positioned on a rear side, the tethers positioned on the front side have a larger dimension in the width direction than the tether positioned on the rear side.

* * * * *